(12) United States Patent
Lindee et al.

(10) Patent No.: US 6,428,303 B2
(45) Date of Patent: *Aug. 6, 2002

(54) FOOD PATTY MOLDING MACHINE

(75) Inventors: Scott A. Lindee, Mokena; Glenn Sandberg, Lockport, both of IL (US)

(73) Assignee: Formax, Inc., Mokena, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,081

(22) Filed: Jun. 4, 1999

Related U.S. Application Data

(60) Provisional application No. 60/088,303, filed on Jun. 5, 1998.

(51) Int. Cl.[7] .............................. A22C 7/00; B29C 54/80
(52) U.S. Cl. ...................... 425/215; 425/225; 425/556; 425/575; 426/513
(58) Field of Search ................................. 425/107, 556, 425/574, 575, 225, 215; 426/512, 513

(56) References Cited

U.S. PATENT DOCUMENTS

| 3,053,529 A | | 9/1962 | Dunn | 271/11 |
|---|---|---|---|---|
| 3,866,741 A | * | 2/1975 | Carbon et al. | 414/789 |
| 3,887,964 A | | 6/1975 | Richards | 425/251 |
| 3,946,117 A | | 3/1976 | Blair et al. | 426/513 |
| 3,952,478 A | | 4/1976 | Richards et al. | 53/122 |
| 4,054,967 A | | 10/1977 | Sandberg et al. | 426/512 |
| 4,081,564 A | | 3/1978 | Borsuk | 426/513 |
| 4,182,003 A | | 1/1980 | Lamartino et al. | 425/556 |
| 4,329,828 A | | 5/1982 | Wagner | 426/513 |
| 4,362,412 A | * | 12/1982 | Kunz | 403/11 |
| 4,372,008 A | | 2/1983 | Sandberg | 426/512 |
| 4,418,446 A | | 12/1983 | Sandberg et al. | 426/513 |
| 4,541,143 A | | 9/1985 | Holly | 426/513 |
| 4,597,135 A | | 7/1986 | Holly et al. | 426/513 |
| 4,608,731 A | | 9/1986 | Holly | 426/513 |
| 4,768,260 A | * | 9/1988 | Sandberg | 425/556 |
| 4,768,325 A | * | 9/1988 | Lindee et al. | 53/122 |
| 4,996,743 A | * | 3/1991 | Janssen | 425/579 |
| 5,655,436 A | | 8/1997 | Soper | 425/556 |
| 5,730,650 A | | 3/1998 | Soper | 425/174 |

OTHER PUBLICATIONS

Formax, Inc., FORMAX 12 (6 pages) No Date.

* cited by examiner

Primary Examiner—Tim Heitbrink
Assistant Examiner—Thu Khanh T. Nguyen
(74) Attorney, Agent, or Firm—Polit & Associates, LLC

(57) ABSTRACT

A patty forming machine includes a frame structure supporting a compartment which encloses a mechanical reciprocating device, the compartment having a front wall. A mold plate locate outside of the front wall includes cavities for receiving food product for the formation of patties. At least one drive rod having a circular cross-section penetrates the front wall and connects the mold plate to the reciprocating device. The machine also includes a vacuum bar assembly having a vacuum bar for interleaving flexible paper sheets with formed patties. The vacuum bar is driven by a reciprocating rod having a round cross-section and penetrating through the front wall of the housing to operatively connect the vacuum bar to the reciprocating device. The frame structure of the machine is underlied by a bottom skin which is spaced below a horizontal frame to provide an access gap for clear viewing and maintenance of a top of the bottom skin.

10 Claims, 16 Drawing Sheets

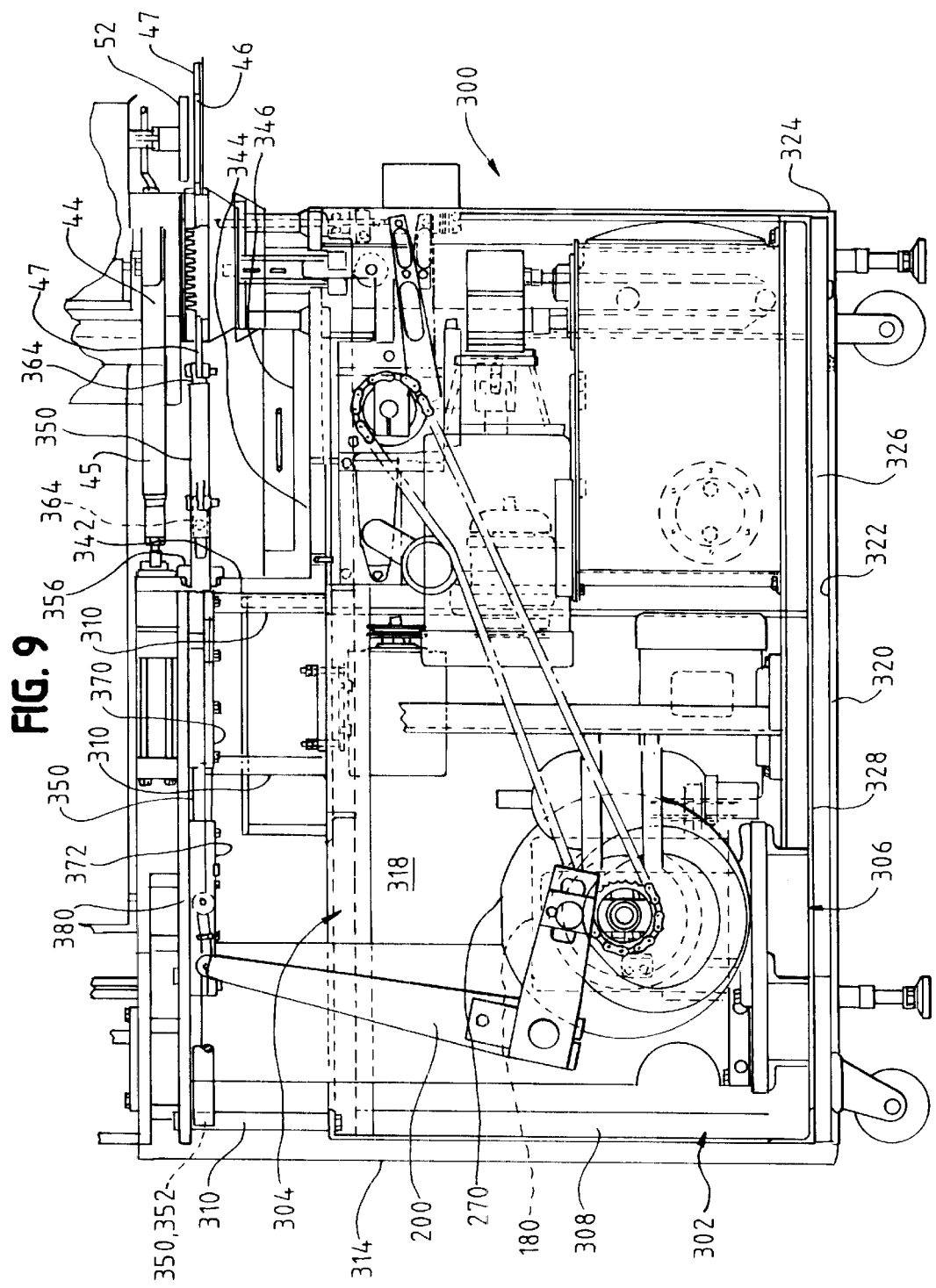

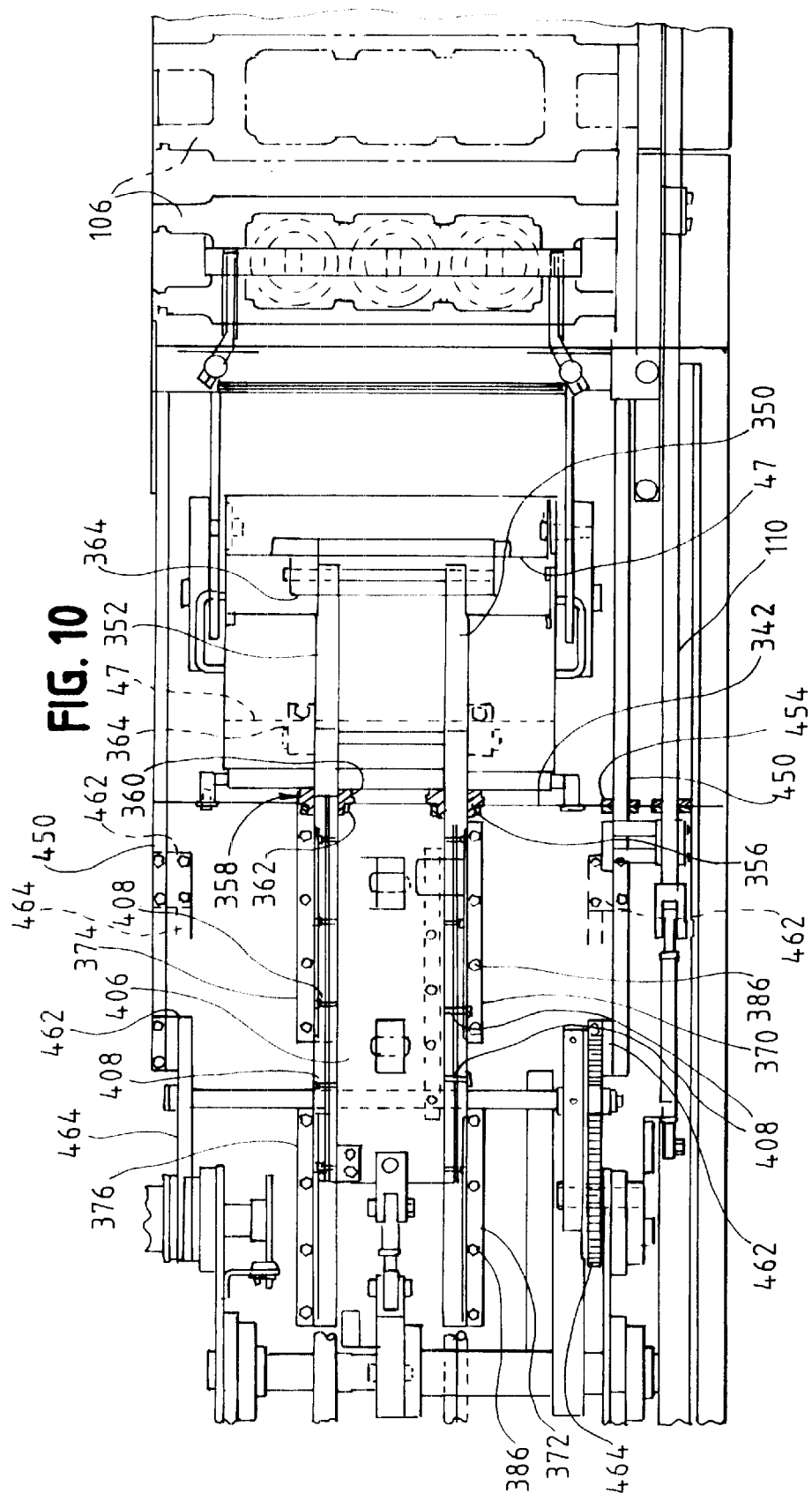

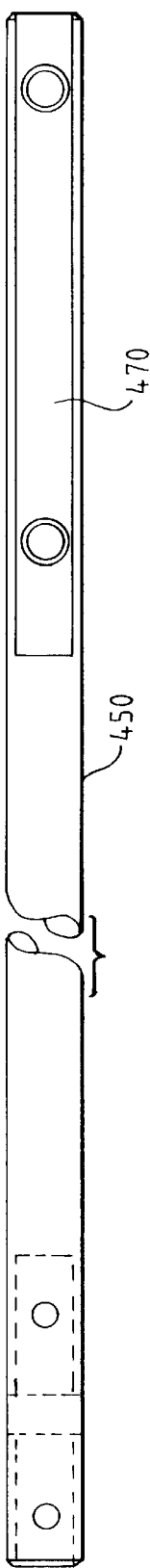
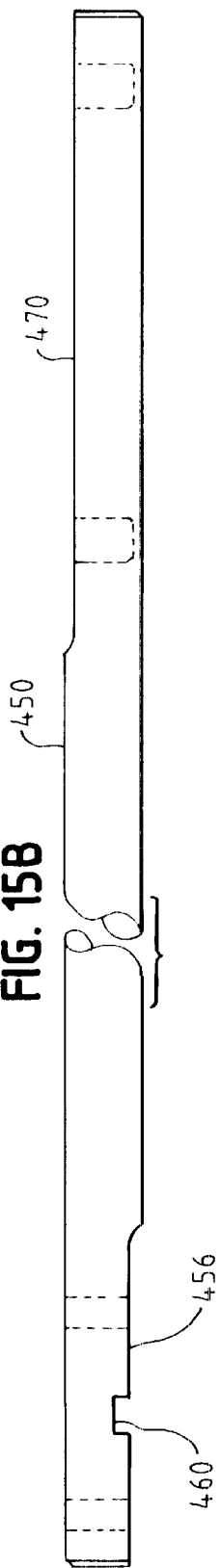
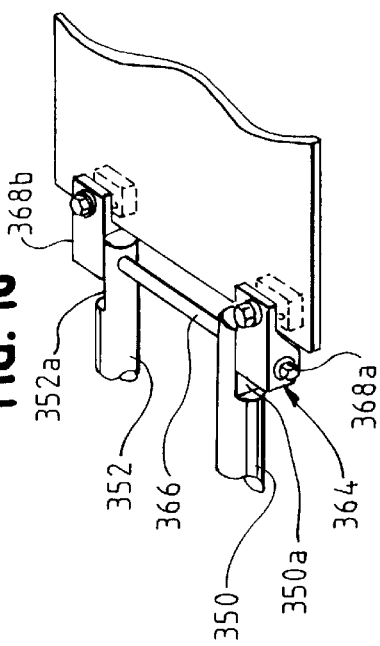
FIG. 15A
FIG. 15B
FIG. 16

FOOD PATTY MOLDING MACHINE

This application is a non-provisional application claiming benefit of prior filed provisional application U.S. Ser. No. 60/088,303 filed Jun. 5, 1998.

STATEMENT REGARDING FEDERALLY SPONSORED RESEARCH OR DEVELOPMENT

Not Applicable.

BACKGROUND OF THE INVENTION

The present invention is directed to a food patty molding machine and in particular to improvements to the operating structure of a known food patty molding machine such as described in FIGS. 1 through 8B.

A FORMAX-12 brand food patty molding or forming machine 30 manufactured by Formax, Inc., of Mokena, Ill., U.S.A. is shown in FIGS. 1–8B. The operation of the machine is generally described in U.S. Pat. Nos. 4,182,003; 4,054,967; and 3,952,478, herein incorporated by reference.

This machine includes a sheet metal housing 34 which encloses the mechanical equipment of the machine. The housing is supported on wheels 35a and/or leveling legs 35b. A hopper 36 is situated at an elevated position on the machine. The hopper includes an open top 40 for receiving bulk food products, for example, whole muscle chicken or ground beef. A pair of feed screws within the hopper (not shown) drives the food product into a pump box area 44 where a reciprocating pump 45 (FIG. 2) presses the food product into mold cavities 46 (shown in FIG. 9) of a reciprocating mold plate 47. The mold plate is reciprocated out of the pump box area to a knock-out area 50 where knock-out cups 52 push the formed meat product or patties out of the cavities and onto a conveyer 56 (FIG. 2). A paper placing station 58 includes mechanisms to interleave paper between patties during the dropping of the patties onto the conveyor.

FIG. 2 illustrates the machine of FIG. 1 with an access door 57 open. The knock-out cups 52 are held on a horizontal bar 60 which is supported by two spaced apart knock-out bar arms 64. The knock-out bar arms 64 are clamped to two vertical, reciprocating knock-out rods 70. The rods 70 are journaled or supported at positions 71a on a mold cover 71 below the knock-out bar arms 64.

As shown more clearly in FIG. 6, the rods 70 are driven by the rotation of cams 72 which are mounted on a cam shaft 73 rotationally mounted to the machine frame. The cam shaft 73 is driven to rotate by a sprocket 74. The sprocket is driven by a drive chain 75, which is driven by the power train of the machine.

The cams 72 have cut-out, flat regions 78. Knock-out arms 79 are pivotally connected to the machine frame at a bolt or axle or pivoting connection 79a and have arcuate ends 80 which slide along the rotating cam surface 84. When the ends 80 reach the cut out, flat regions 78 of the cams, the knock-out arms 79 rotate downwardly in the direction R, and then rotate upwardly in a reverse direction when the flat regions 78 have passed. Thus, rotation of the cams 84 causes an up and down pivoting of the knock-out arms 79 about the connection 79a. An opposite end 90 of each of the knock-out arms is connected to one knock-out rod 70 by a bolted linkage 92 and by a bolt 94. Extending outwardly from each rod 70 is a flag or lug 96 having a hole for receiving a machine screw 98 which is threaded into one of two opposite ends of a spacer rod or tie rod 100.

An oil pan 101 is located beneath each cam 72. One will be described, the respective other is mirror image identical. A front wick 102 made of a woven, sponge or other wick material, is located at the pivoting connection 79a, held in place by a washer 102a to continuously oil the pivoting connection 79a. A rear wick 103 is held against the cam surface 84 to continuously oil the interface between the section 78 and the end 80 of the knock-out arm 79. The pan has an open top 104 through which the wicks 102, 103 are dipped. The pan 101 holds a supply of oil 105.

Each bolted linkage 92 is also connected by a bolt 95a to a vertical leg 95b of a moveable plate 95. The plate is held within a guide frame 97 which is mounted by machine screws to a stationary part of the machine frame, at a top of the frame 97. Two springs 95d are mounted between an upper wall of the frame and a bottom leg 95c of the plate and resist the upward lifting of the plate within the frame. The springs are therefore the driving downward force generator of the knock-out operation. In FIG. 4D the springs are shown compressed with the knock-out rod lifted by the associated cam 72. In FIG. 6, the springs are expanded, and the knock-out rods have been driven to their downward position.

The knock-out bar arms 64 are mounted to top ends of the rods 70. The bar arms 64 are each fixed vertically to a rod by a top fastener 64a, and rotationally by a clamp arrangement 64b closed by a horizontal fastener 64c. The bar arms 64 are fastened by bolts or machine screws to the horizontal bar 60 which holds the knock-out cups 52. Depending on the product being formed, the bar 60 and cups 52 can have a different shape, and/or the bar can carry a different number of cups.

Also shown in FIG. 2 is a vacuum bar assembly 106 which reciprocates during operation of the machine as part of a vacuum transfer shuttle or vacuum bar assembly for interleaving flexible paper sheets with formed patties as described in U.S. Pat. Nos. 3,952,478; 4,182,003; or 4,054,967. Also included is a paper placer assembly 107 which places the flexible paper sheets onto the vacuum bar assembly. Both the vacuum bar assembly and the paper placer assembly are driven by reciprocal motion of rods, i.e., by vacuum bar rods 108, 108a (see FIG. 8B) having a square cross section, and by a paper placer drive rod 110 having a round cross section, respectively.

FIG. 3 illustrates the reciprocating mold plate 47 connected via a hinge assembly 120 to a drive plate or slide plate 124. The drive plate 124 has an elongated rectangular cross section. The drive plate 124, the vacuum bar drive rod 108 and the paper placer drive rod 110 must all penetrate through, and reciprocate through the penetration of, a front wall or skin 130 which separates the food forming front section of the machine from the mechanical compartment. For sanitary reasons, at each penetration a sealing element is provided. The drive plate 124 requires a rectangular sealing element 140 bolted to the skin 130. A similar rectangular seal 144 must be provided at the vacuum rod drive bar 108 as it penetrates the skin 130. Rectangular seals, because of sharp corners are more prone to leakage, and are more expensive than standard circular shaft or rod seals. A circular seal 145 can be used at the paper placer drive rod 110 where it penetrates the skin 130.

FIG. 4A shows the vacuum bar drive rod or shuttle arm 108 penetrating the skin or wall 130. The rod 108 is connected via an intermediate plate 150 to a rack 152. The rack 152 is driven to reciprocate by a pinion 154.

FIGS. 8A and 8B show the arrangement of the vacuum bar drive rod 108 in more detail. The rack 152 is slidably held in a channel 153. It is to be noted that there are two drive rods 108, 108a arranged on a right side and a left side of the machine respectively. Each of the rods 108, 108a is connected to a rack and driven by a pinion 154 as shown in FIG. 8A. Each of the rods 108, 108a is connected to one lateral side of the vacuum bar 106 by two machine screws or bolts 156. The rods 108 pass through bearing blocks 160, 160a respectively before being connected to the vacuum bar 106. A paper placer drive sprocket 160 rotates a paper placer drive shaft 162 which rotates a paper placer crank arm 163 (shown in FIG. 4C) which drives the paper placer drive rod (via linkages) to reciprocate. The crank arm rotates about a horizontal axis of the drive shaft.

Returning to FIGS. 4A and 4B, the main drive motor 170 is shown, arranged for driving a drive motor pulley 172 which drives a drive belt 174. The drive belt 174 drives a reducer pulley 176 which inputs rotational power to a mold plate drive reducer 180 (see FIG. 5). A reducer output shaft 182 outputs rotational power from the reducer 180. Sprockets and pulleys which are fixed to the output shaft 182 drive various systems including the drive chain 75 for actuating the knock-out rods 70, and a drive chain 185 for the paper placer sprocket 160. A hydraulic oil tank 186 is located at a front bottom portion of the machine. A rear output shaft of the main drive motor 170 drives a hydraulic pump 187 which powers the hydraulic systems of the machine. Also shown in FIG. 4B is a bottom skin or floor 188 which is located at an elevation equal to a bottom 190 of a bottom horizontal frame member 192. The bottom skin 188 substantially covers a bottom of the machine.

FIG. 5 illustrates that the drive system for the mold plate includes a long rocker arm 200 which is connected by a slide plate linkage 202 to the slide plate or drive plate 124. Laterally arranged slide bearings 206a, 206b receive lateral edges of the slide plate 124 and guide the reciprocating movement of the slide plate 124 therein. The lateral bearings 206a, 206b are fixed to the machine overhead structure. Also shown is a feed screw gear box 210 for driving the feed screws within the hopper 40. A cabinet blower 211 driven by a motor 212 is used to circulate cooling air or purge air through the housing 34.

FIG. 7 shows the drive for the molding plate 47 in more detail. The hinge assembly 120 includes fixed hinge plates 214a, 214b holding a hinge axle 216 upon which are mounted hinged grippers 218a, 218b. The axle 216 allows a degree of pivoting between the fixed hinge plates 214a, 214b and the grippers 218a, 218b respectively. The hinged grippers 218a, 218b include bottom jaws 219a, 219b which are fixed to the upper jaws by machine screws 220, but when the bottom jaws 219a, 219b are released by unscrewing of the machine screws 220, they can pivot downwardly about the axle 216 to allow downward removal of the mold plate 47. The mold plate 47 is provided with holes for allowing passage of the machine screws 220. The hinge plates 214a, 214b are fixed to the slide plate 124 by machine screws 224 which pass through the slide plate 124 and are received into threaded holes in an underlying part of the hinge plates 214a, 214b respectively.

The slide plate linkage 202 includes an adjustable female rod end 230 connected to a clevis 232 which is fixed to the slide plate 124 via a machine screw 236 which is threaded into an underlying part of the U-shaped clevis. The slide plate 124 includes a hole for receiving the machine screw 236. A bolt 238 connects the clevis 232 with an eye-bolt of the female rod end 230. This allows pivoting about the horizontal between the clevis 232 and the female rod end 230. A male rod end 240 is threaded into the female rod end 230 and includes an eyebolt end 242 for receiving a bolt 246 to allow relative pivoting about the horizontal axis between the male rod end 240 and the long rocker arm 200. A short rocker arm 256 is fixed to the long rocker arm 200 by a shear pin 250 via a shaft 254. The short rocker arm 256 includes an adjustable follower 260 which rides in a shaped cam channel 266 formed in the mold plate drive cam 270. The mold plate drive cam 270 is driven in rotation by the mold plate drive reducer 180 (shown in FIG. 5). The interaction between the short rocker arm, the cam 270 and the long rocker arm causes back and forth reciprocation of the slide plate 124, and thus the mold plate 47.

The inventors have recognized that it would be advantageous to provide an improved patty forming machine, which reduces or eliminates the need for rectangular seals at the front wall of the mechanical compartment. The inventors have also recognized that it would be advantageous to provide a patty forming machine having a bottom skin which can be more freely and reliably cleaned and drained.

SUMMARY OF THE INVENTION

The invention provides an improved patty forming machine. Particularly, the invention includes an improved vacuum bar shuttle rod having a circular cross section which is more easily, reliably and economically sealed at its penetration at a wall which separates the mechanical compartment from the patty forming compartment compared to the square cross sectional bars of the prior art machine described in FIGS. 1–8B. The invention also provides an improved mold plate drive by replacing a portion of the flat slide plate or drive plate of the prior art machine described in FIGS. 1–8B with two parallel drive rods having circular cross sections. The rods can be more readily, reliably and economically sealed at the wall which separates the mechanical compartment from the patty forming compartment. Additionally, the invention provides an improved housing for the machine in that a bottom floor or bottom "skin" is spaced one inch from the bottom-most horizontal frame for better drainage and cleaning and visual inspection.

Numerous other advantages and features of the present invention will become readily apparent from the following detailed description of the invention and the embodiments thereof, and from the accompanying drawings in which details of the invention are fully and completely disclosed as part of this specification.

BRIEF DESCRIPTION OF THE DRAWINGS

FIG. 9 is a fragmentary right side elevational view of a patty forming machine of the present invention;

FIG. 10 is a fragmentary sectional view taken generally along line 10—10 from FIG. 9A;

FIG. 15A is a plan view of a shuttle drive bar taken from FIG. 10;

FIG. 15B is an elevational view of the shuffle drive bar of FIG. 15A;

FIG. 16 is a fragmentary, enlarged perspective view of a connection detail between mold plate drive rods and a mold plate taken from FIG. 9.

DETAILED DESCRIPTION OF THE PREFERRED EMBODIMENTS

Figure 1:
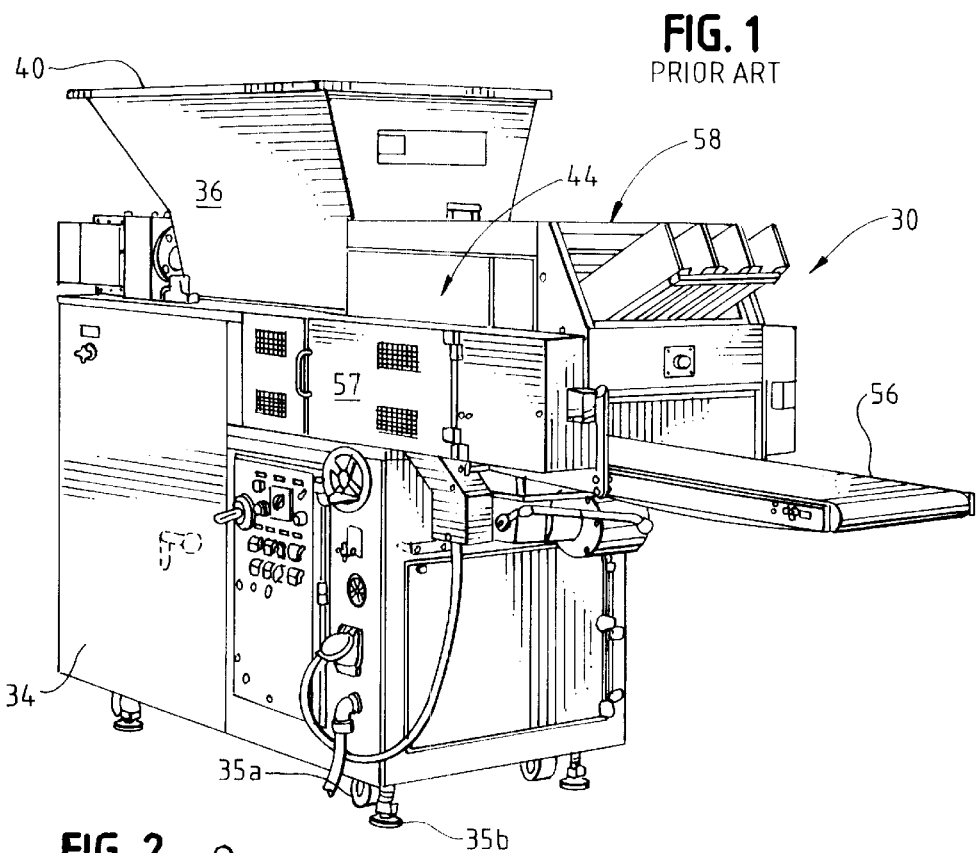
FIG. 1 is a perspective view of a prior art patty forming machine.
Figure 2:
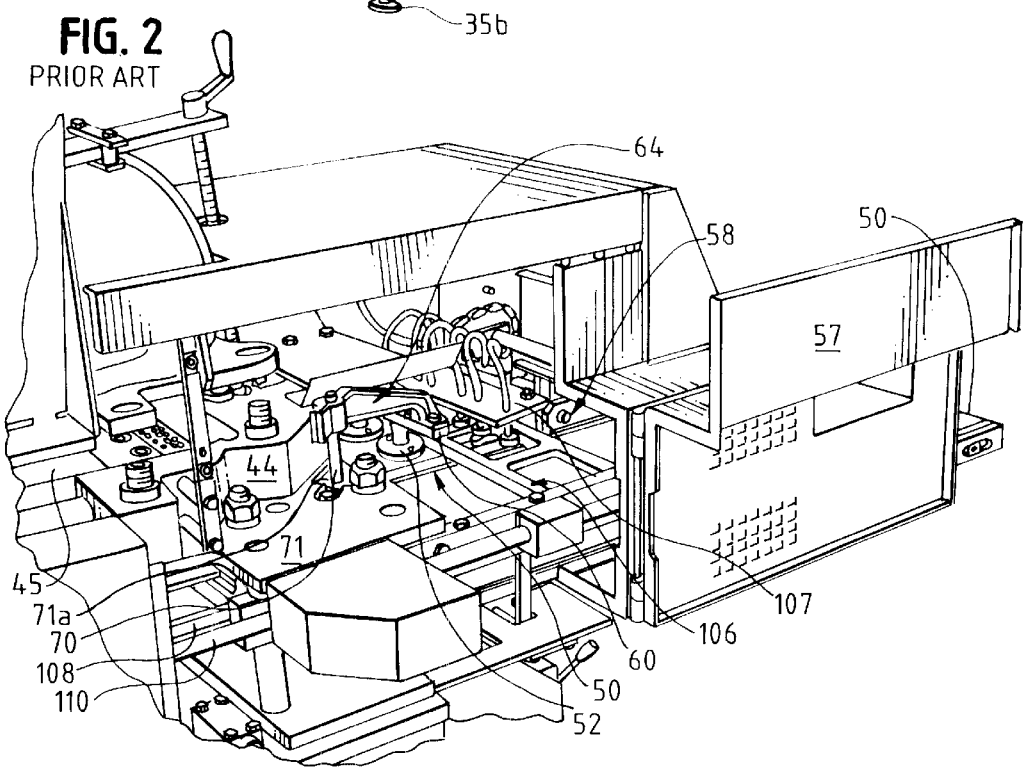
FIG. 2 is a fragmentary, enlarged perspective view of a portion of the machine shown in FIG. 1, with an access door opened to allow viewing inside the cabinetry.
Figure 3:
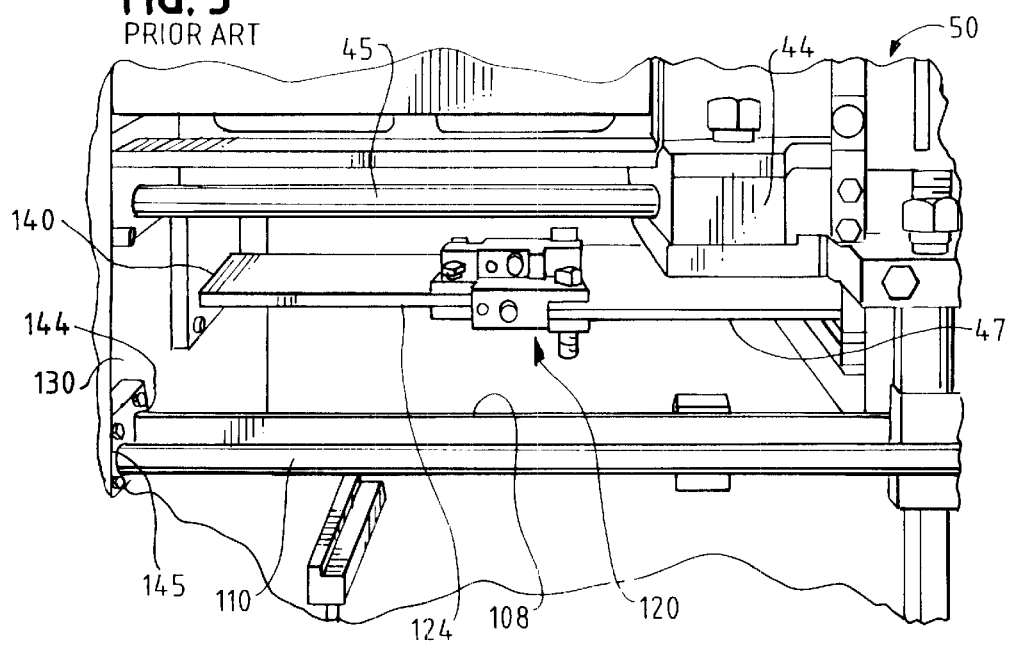
FIG. 3 is a fragmentary perspective view of a portion of the machine of FIG. 1 with cabinetry opened or removed to allow viewing of mechanical components.
Figure 4A:
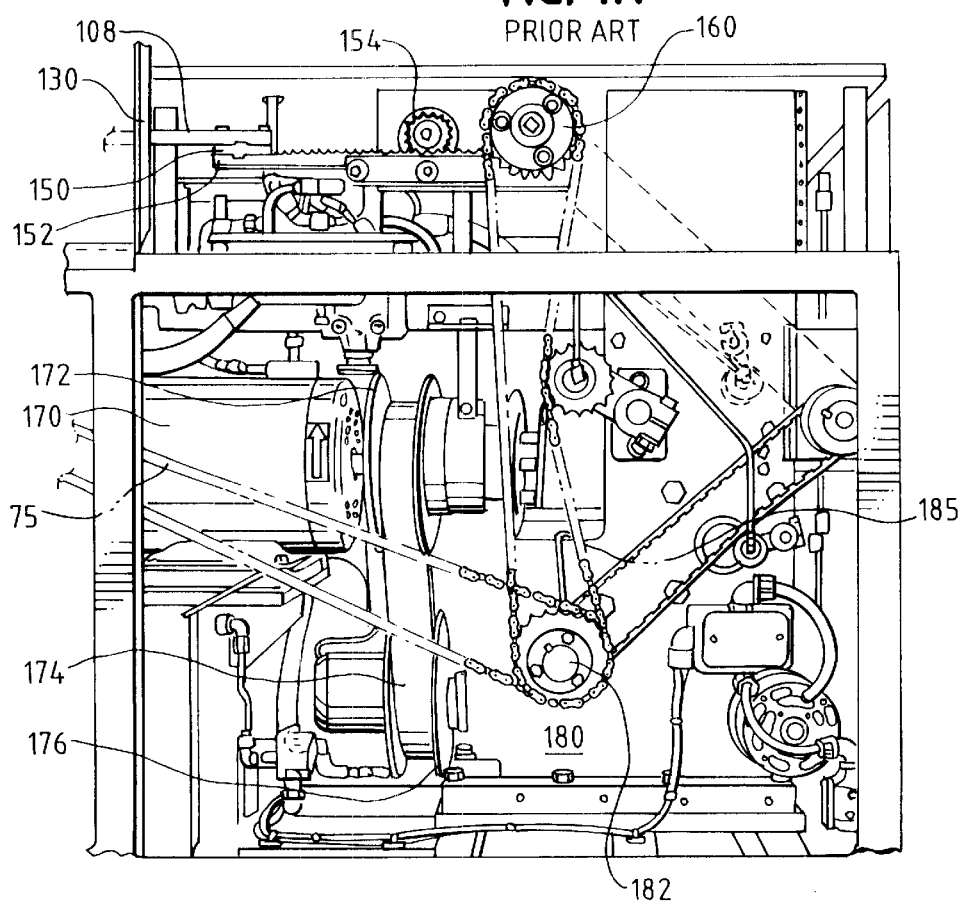
FIG. 4A is a fragmentary left side, rear elevational view of the machine shown in FIG. 1 with cabinetry removed to view the inside mechanical components.
Figure 4B:
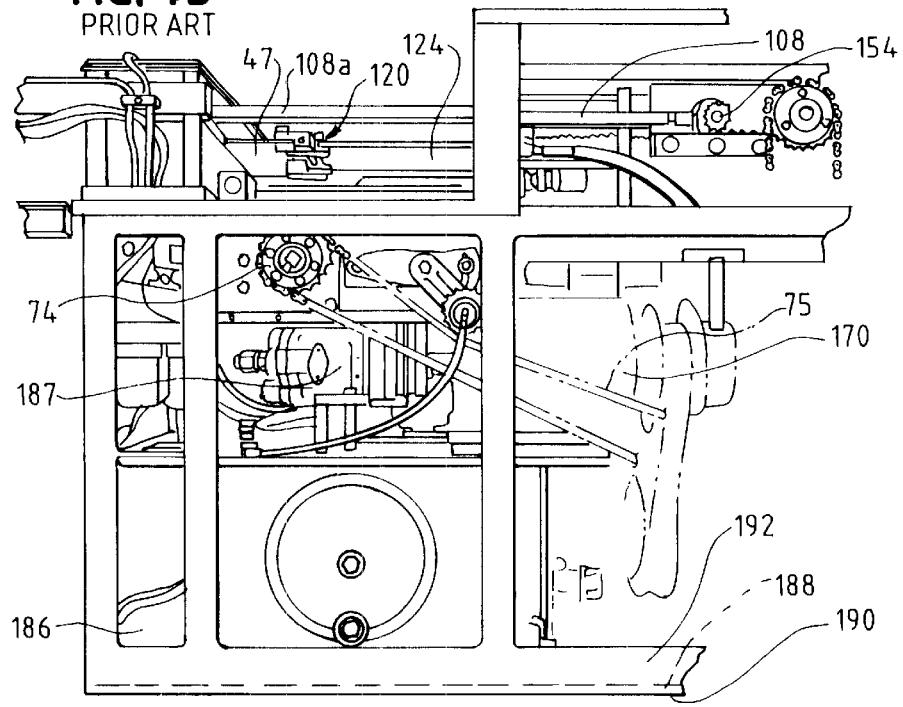
FIG. 4B is a fragmentary left side, front elevational view of the machine of FIG. 1 with cabinetry removed to view the internal mechanical components.
Figure 4C:
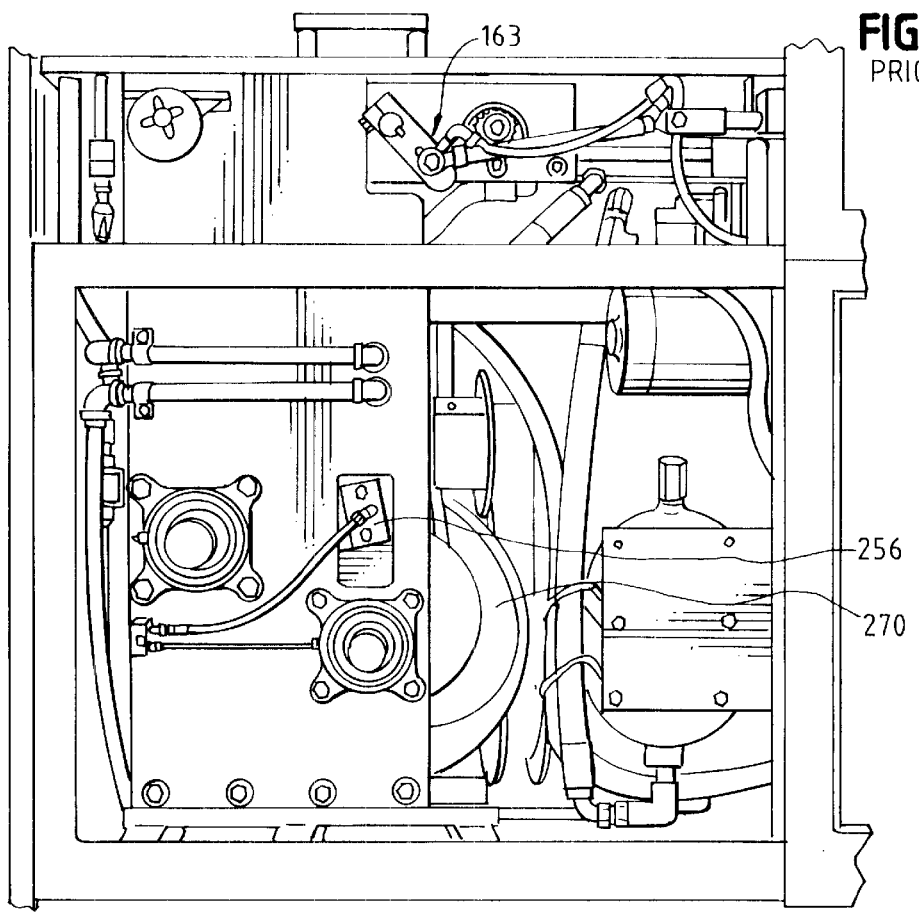
FIG. 4C is a fragmentary right side, rear elevational view of the machine of FIG. 1 with cabinetry either removed or opened to view the inside mechanical components.
Figure 4D:
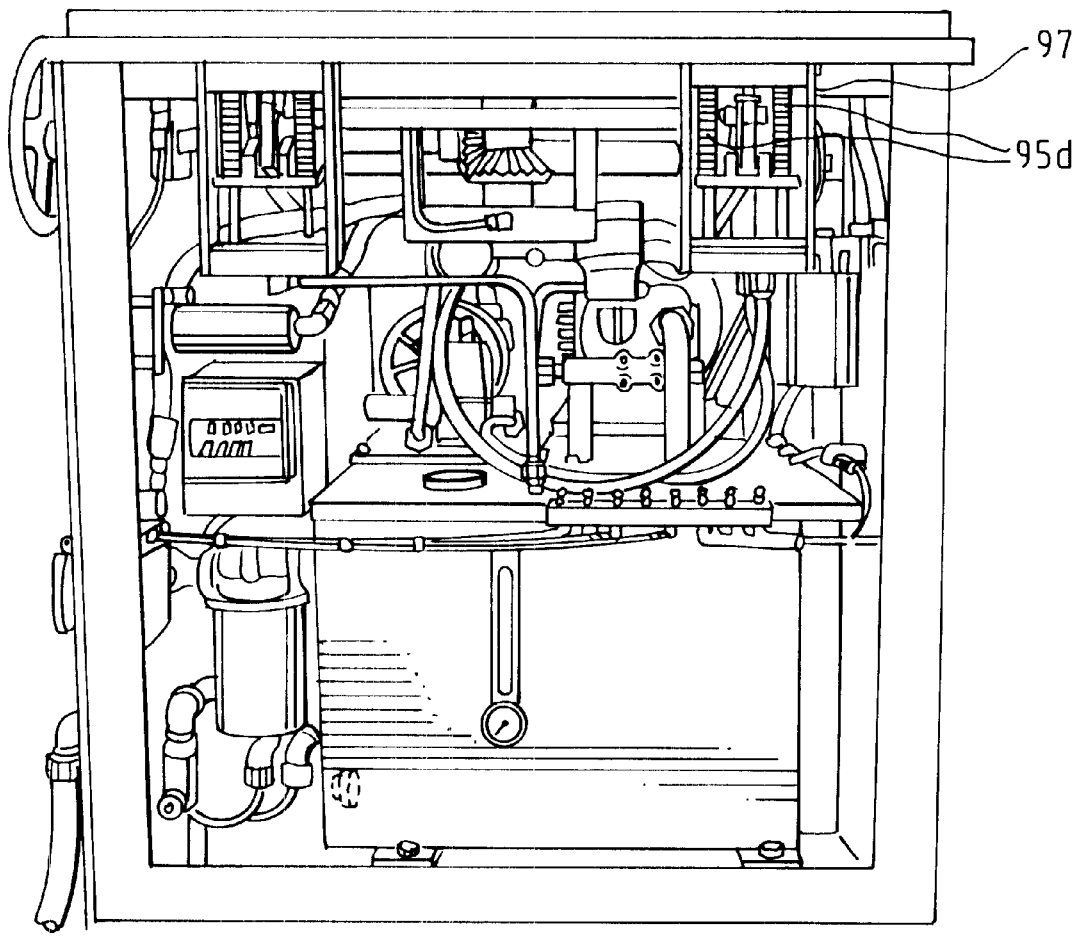
FIG. 4D is a fragmentary front end view of the machine of FIG. 1 with cabinetry removed to view inside mechanical components.
Figure 5:
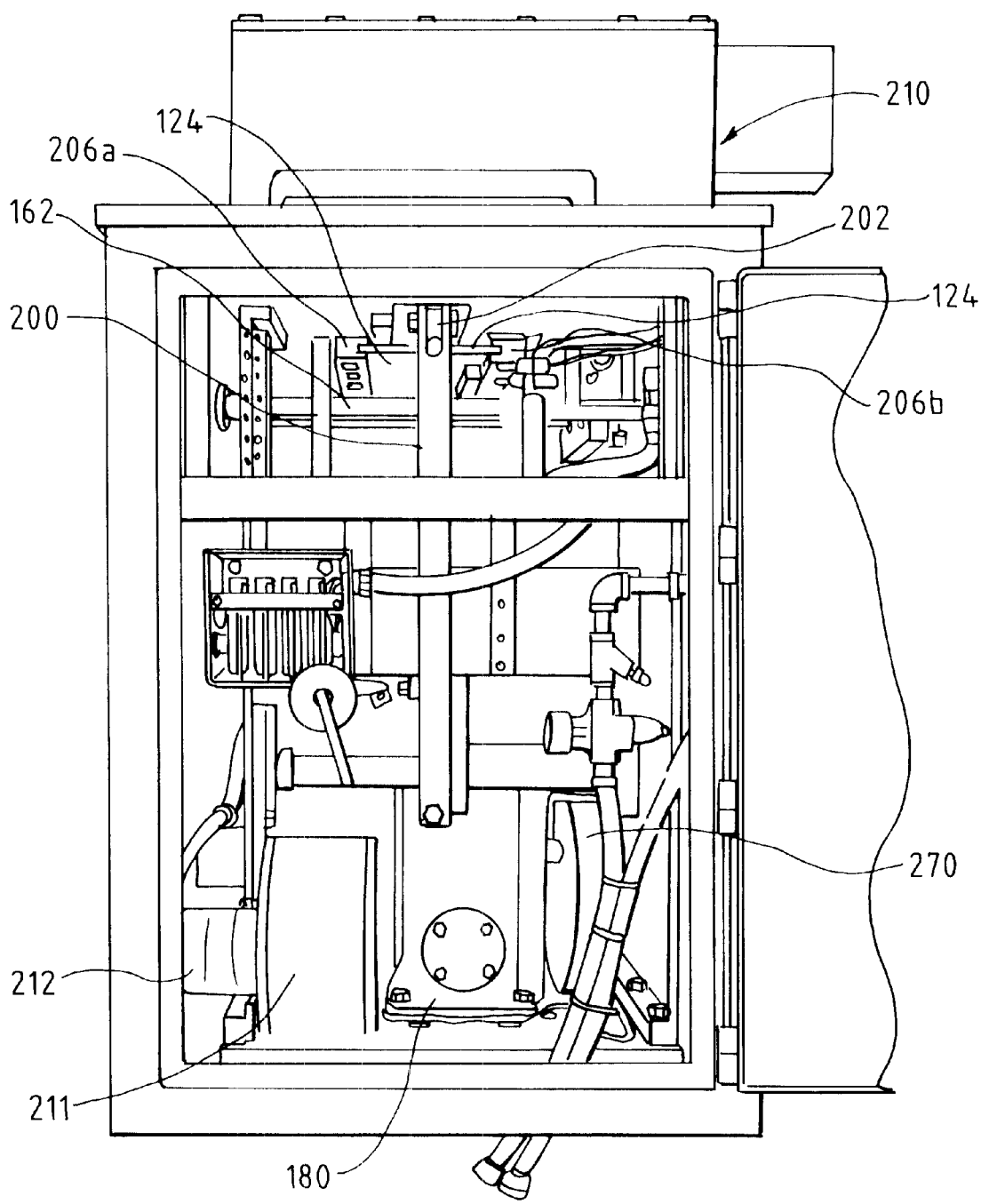
FIG. 5 is a fragmentary rear view of the machine of FIG. 1 with a rear door opened to view inside mechanical components.
Figure 6:
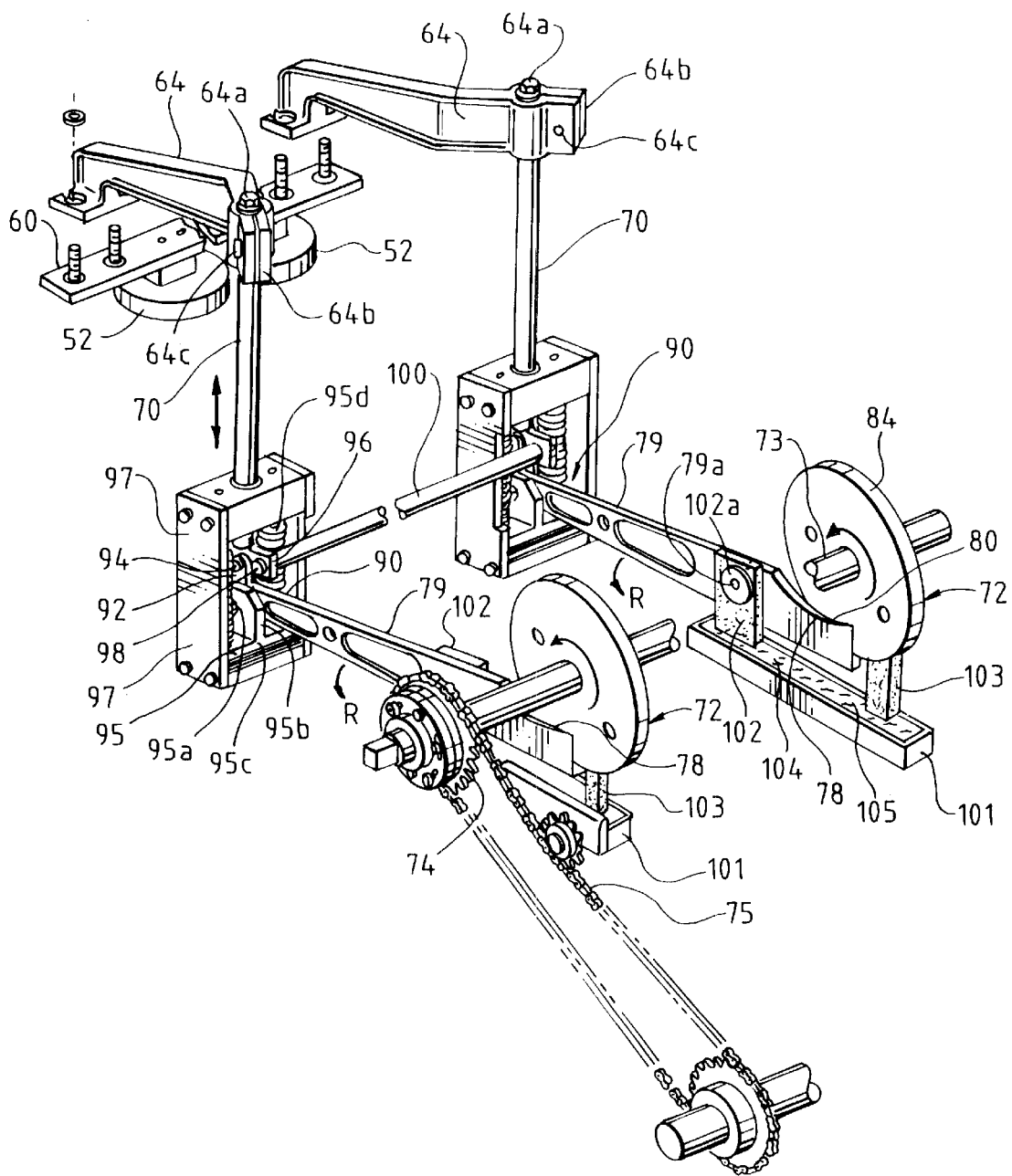
FIG. 6 is a partially exploded, fragmentary, enlarged perspective view of a patty knock-out system of the machine shown in FIG. 1, isolated from surrounding components for clarity.

While this invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Figure 9A:
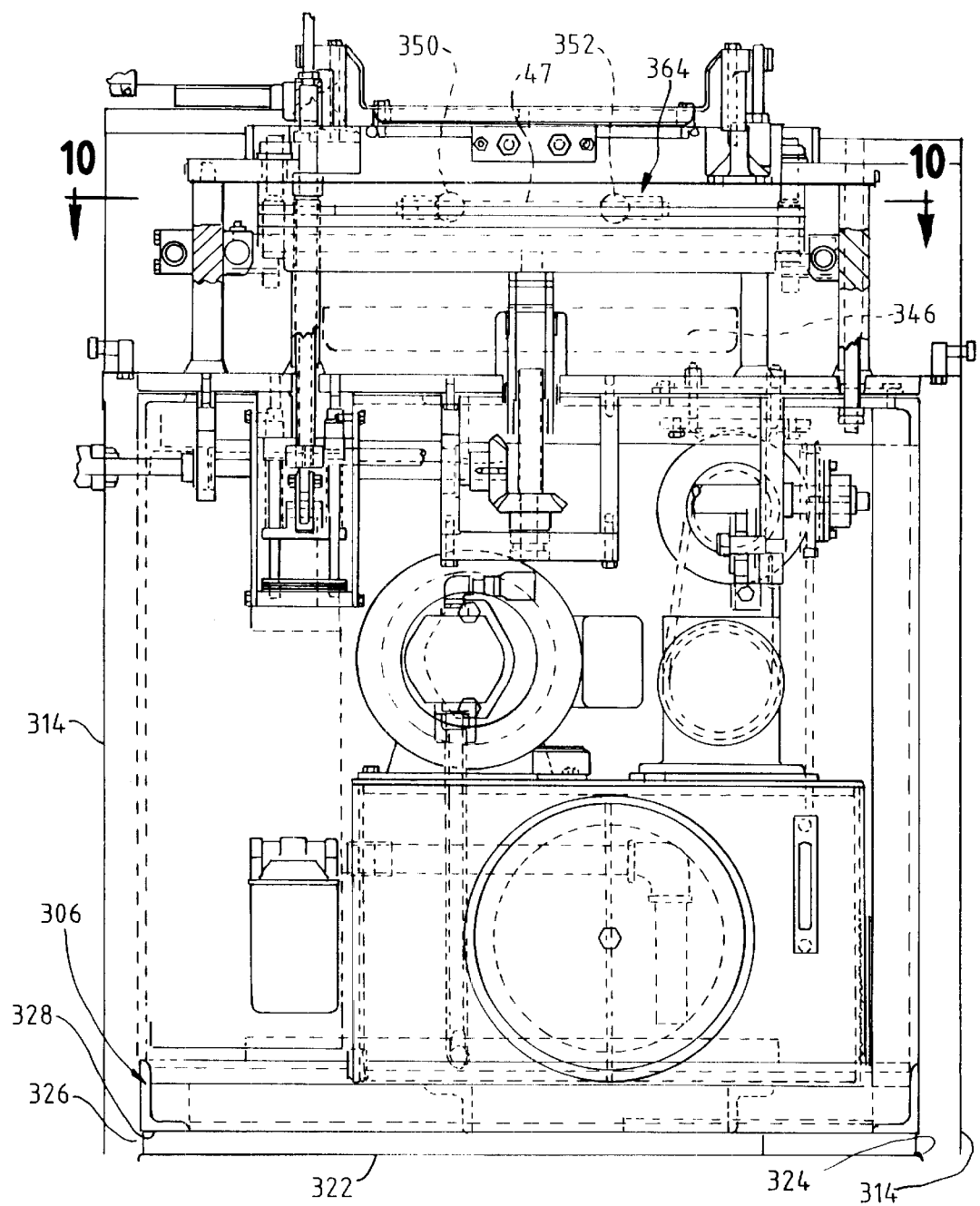
FIG. 9A is a fragmentary front end view of the patty forming machine shown in FIG. 9.

FIG. 9 illustrates a patty forming machine 300 arranged and configured substantially similarly to the machine shown in FIGS. 1–8B except as described below. The machine is structurally supported on and within a rectangular space frame 302 having an upper rectangular frame 304 and a lower rectangular frame 306 supported by columns 308 at each corner and intermittently along sides of the frame 302. A plurality of tubular supports 310 extend above the upper rectangular frame 304 to support overhead equipment. A skin 314 surrounds a mechanical compartment 318 and includes a bottom skin or floor 320 which has a top surface 322 and a downwardly bent surrounding lip 324. The top surface slopes slightly from its edges to a center region which includes a center drain. The bottom skin 320 prevents contamination of the components within the housing 34 caused by spraying or splashing against the floor during operation, or during spray cleaning of the machine. The machine 300 provides a gap 326 between a bottom 328 of the lower rectangular frame 306, which surrounds a perimeter of the mechanical compartment 318, and the top surface 322. The gap 326 is preferably about one inch and allows for better drainage and cleaning of the bottom skin 320 due to noninterference with the lower frame 306. The gap 326 is accessible upon opening of a cabinet doors and panels and allows a more effective viewing of the top surface 322 of the skin 320.

The mechanical compartment 318 is separated from a patty molding area by a front barrier wall 342 and a top barrier wall 344. A recovery pan 346 connected to the front barrier wall 342 overlies the top barrier wall 344. The mold plate 47 is driven into reciprocation by two parallel mold plate drive rods 350, 352 (see FIG. 9A). The drive rods 350, 352 each pierce through the barrier wall 342 through a seal assembly 356, 358 respectively (see FIG. 10). The seals 356, 358 provide a sealing and wiping action and are preferably rod wiper type seals for round rods. These seals are two-component seals having a seal body 360 and a back side lock nut 362. At a front end of the rods 350,352 are flat regions to which is connected a hinge assembly 364 as shown in FIG. 16. The hinge assembly 364 functions substantially the same as the hinge assembly 120 described in FIG. 7 except that the rods 350, 352 are connected to the hinge assembly 364 via the hinge axle 366 and end retaining machine screws 368a, 368b.

The rods 350, 352 as well as the hinge assembly 364 and the plate 47 are shown in two positions in FIG. 10: a forward-most position (shown solid) and a rear retracted position (shown in phantom).

The rods 350, 352 extend rearwardly within the mechanical compartment 318 to a fully retracted position shown in phantom in FIG. 9. The parallel rods, 350, 352 are guided in linear rod bearings 370, 372, 374, 376 which are each fixed to a top structure plate 380 which is supported and fixed by the columns 310. The bearings 370,372,374,376 are each formed of upper and lower halves which are bolted together by way of machine screws 386.

Figure 17:
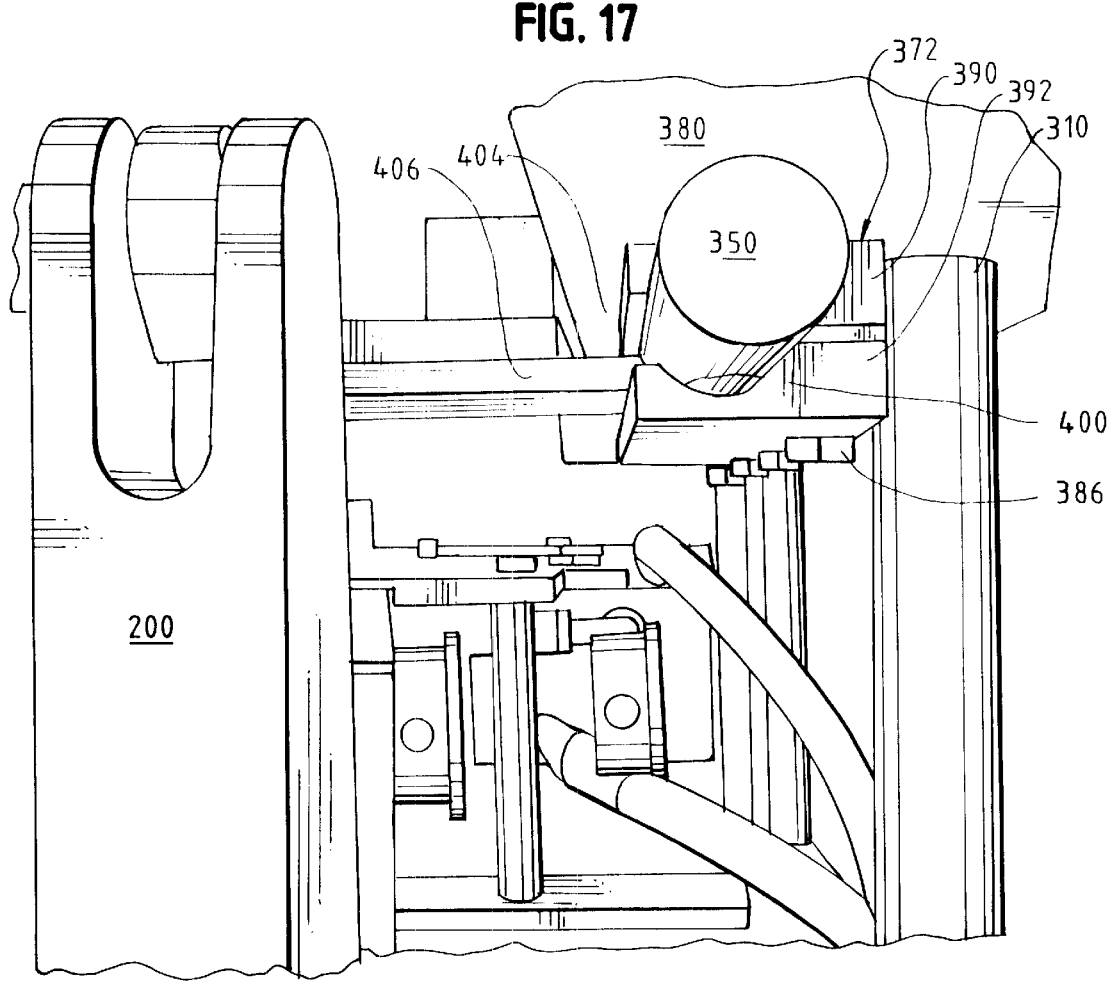
FIG. 17 is a rear fragmentary perspective view of the patty forming machine of FIG. 9.

The bearing 372 is shown in FIG. 17. The bearing 370 is identically fashioned. The bearings 374, 376 are configured in mirror image fashion. The bearing 372 includes a top bearing 390 which is fixed to a bottom bearing 392 by the fasteners 386 which can also be used, given sufficient length, to fasten the bearing assembly 372 to threaded holes in the overhead structure 380. The upper and lower bearing halves 390, 392 each include C-shaped bearing surfaces 400 which are treated with a Teflon or other friction reducing bearing material, or alternatively have rollers or other friction reducing members therein. The bearing halves 390, 392 provide an inside longitudinal gap 404 for allowing the lengthwise movement of a slide plate 406 through the bearing 372. The slide plate 406 is fastened to the rod 350 along one lateral side thereof, and fastened to the rod 352 along an opposite lateral side thereof by a plurality of spaced apart fasteners 408.

Figure 7:
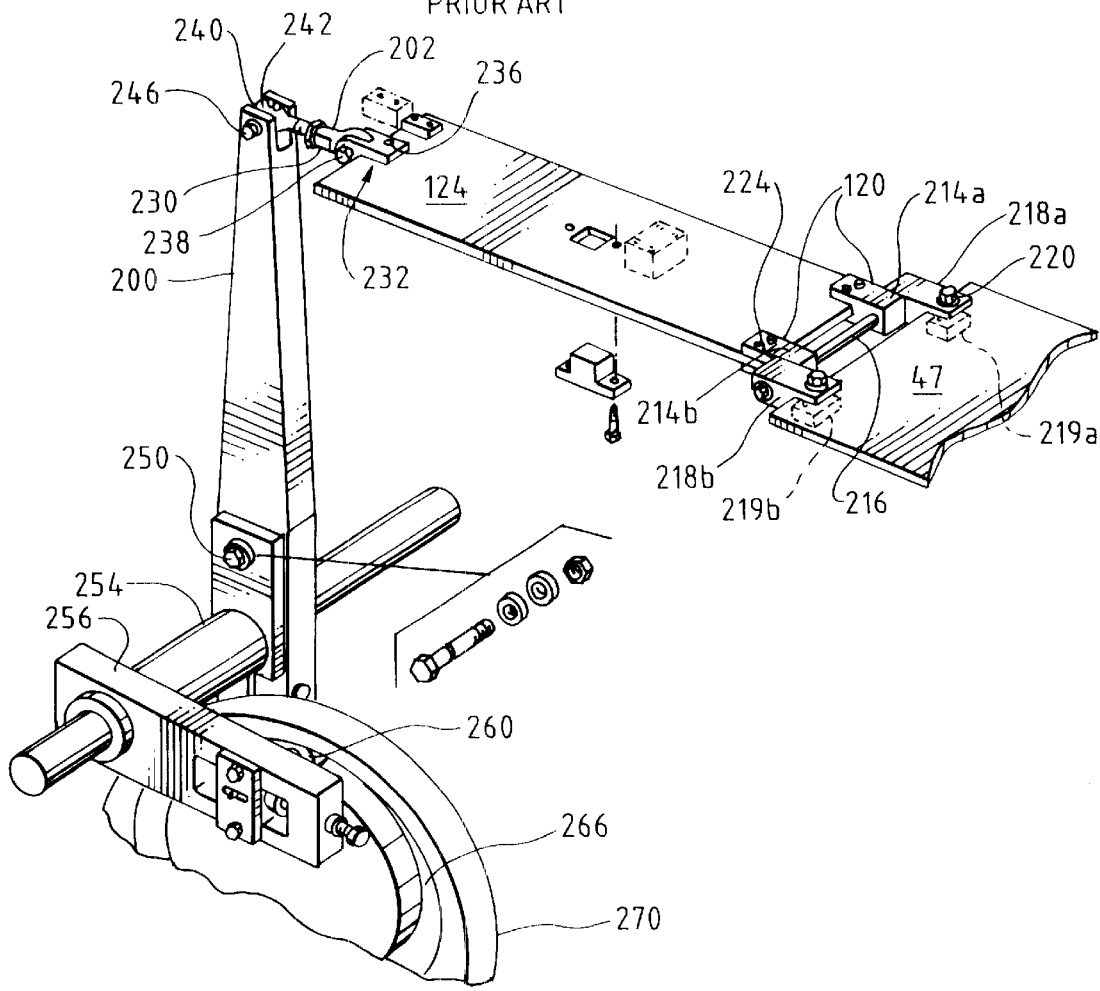
FIG. 7 is an enlarged, fragmentary, partially exploded, perspective view of a mold plate driving system from the machine shown in FIG. 1 viewed in isolation from surrounding components for clarity.
Figure 8A:
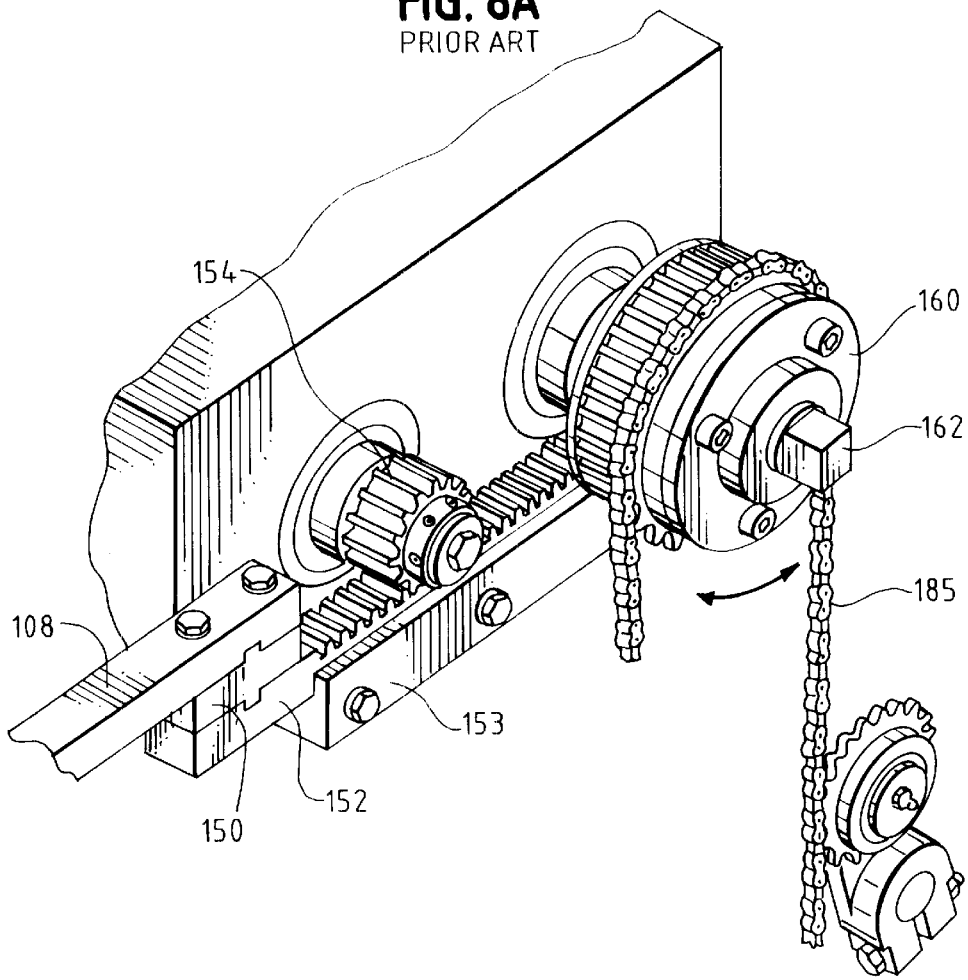
FIG. 8A is an enlarged, fragmentary, perspective view of a vacuum bar shuttle system from the machine in FIG. 1, shown in isolation from surrounding components for clarity.
Figure 8B:
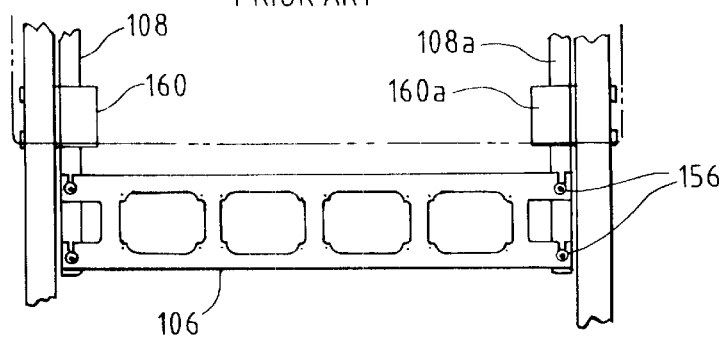
FIG. 8B is an enlarged fragmentary plan view of a vacuum bar connected to left and right vacuum bar shuttle arms, taken from the machine of FIG. 1, shown in isolation from surrounding components for clarity.

The long rocker arm 200 is connected to the slide plate 406 in identical fashion to the connection between the long rocker arm 200 and the slide plate 124 as shown in FIG. 7, that is, using the clevis, female rod end, male rod end and associated bolts. The long rocker arm 200 is connected to a slide plate driving system, including the cam plate 270, substantially as shown in FIG. 7. Reciprocal pivoting of the long rocker arm 200 causes the longitudinal reciprocation of the slide plate 406 and the two rods 350, 352 through the bearings 370, 372, 374, 376.

A further improvement of the present invention involves the structure of a vacuum arm shuttle rod 450. This rod 450, unlike the vacuum bar shuttle arms 108, 108a shown in FIGS. 8A and 8B, has a round cross section. This facilitates the use of an annular seal 454 at the barrier wall 342, such as a rod wiper type seal. Similar to the seals 356,358, the seal 454 is a two piece annular seal.

Figure 11:
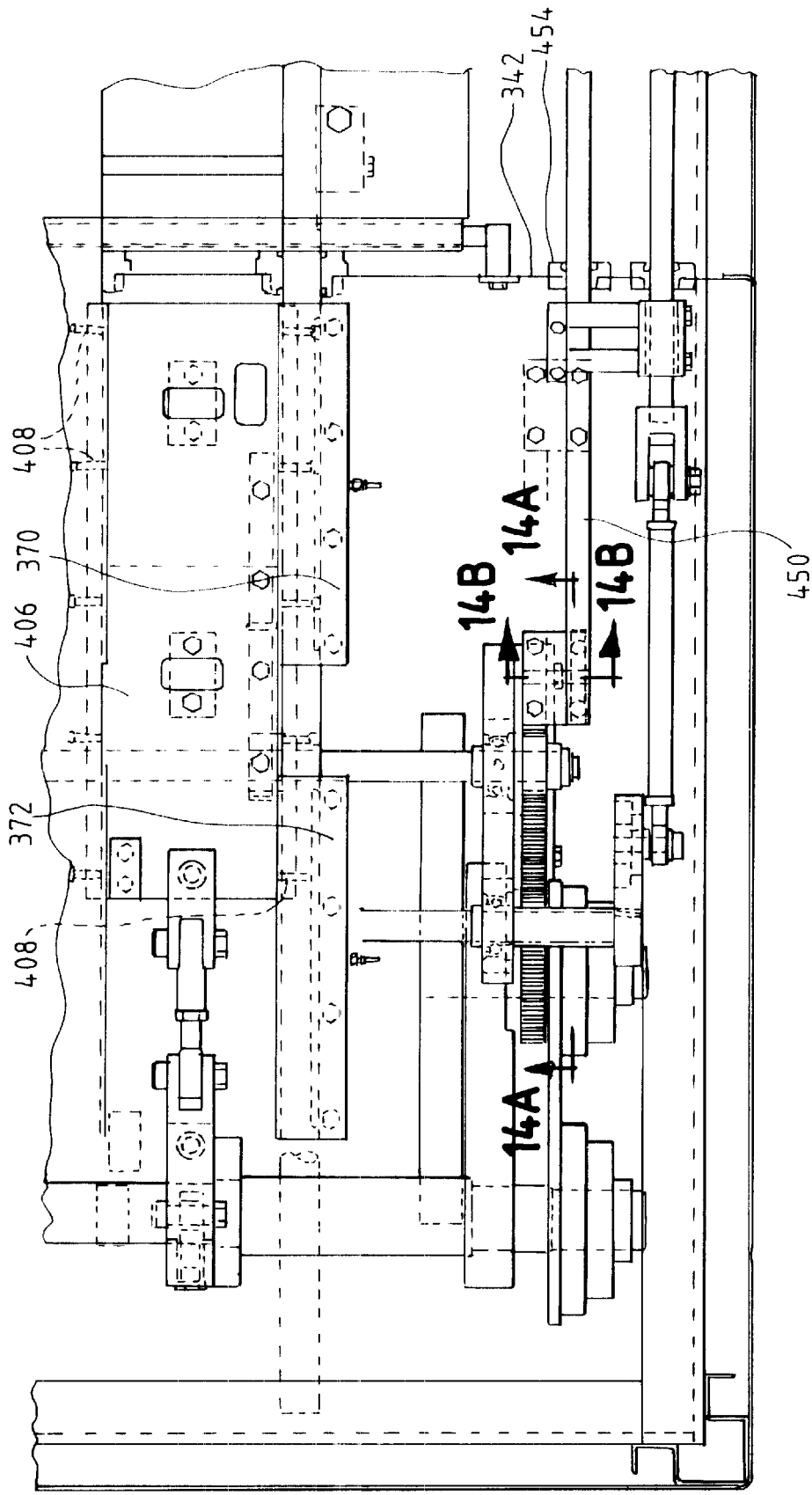
FIG. 11 is an enlarged fragmentary plan view taken from FIG. 10.
Figure 14A:
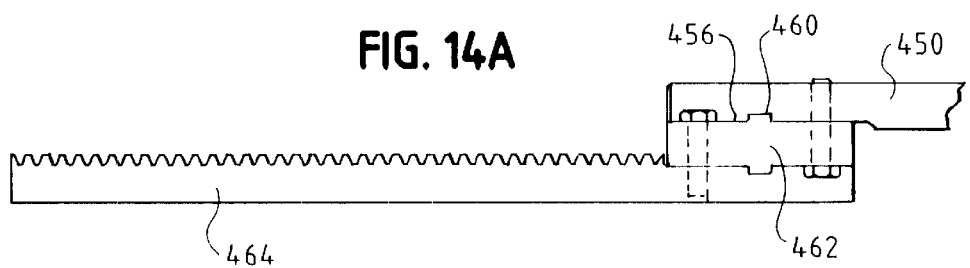
FIG. 14A is a sectional view taken generally along line 14A—14A from FIG. 11.
Figure 14B:
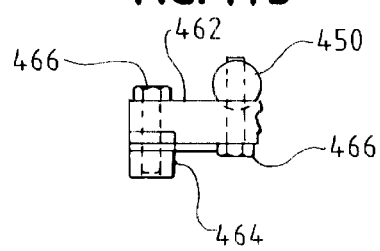
FIG. 14B is a sectional view taken generally along line 14B—14B from FIG. 11.

FIGS. 11, 14A and 14B illustrate the rod 450 having a flat section 456 having a keyway 460 for receiving an intermediate plate 462 which connects to a rack 464. The rod 450, the intermediate plate 462 and the rack 464 are fastened by machine screws or bolts 466. The rack 464 is reciprocally driven by a pinion such as the pinion 154 as previously described in FIG. 8A, with regard to driving the rack 152.

As shown in FIG. 10, two rods 450, two racks 464 and two plates 462 are arranged in two assemblies which are assembled in mirror image fashion on opposite sides of the machine and connected to the bar 106 to operate in tandem as described above with regard to the prior art rods 108, 108a.

Figure 12:
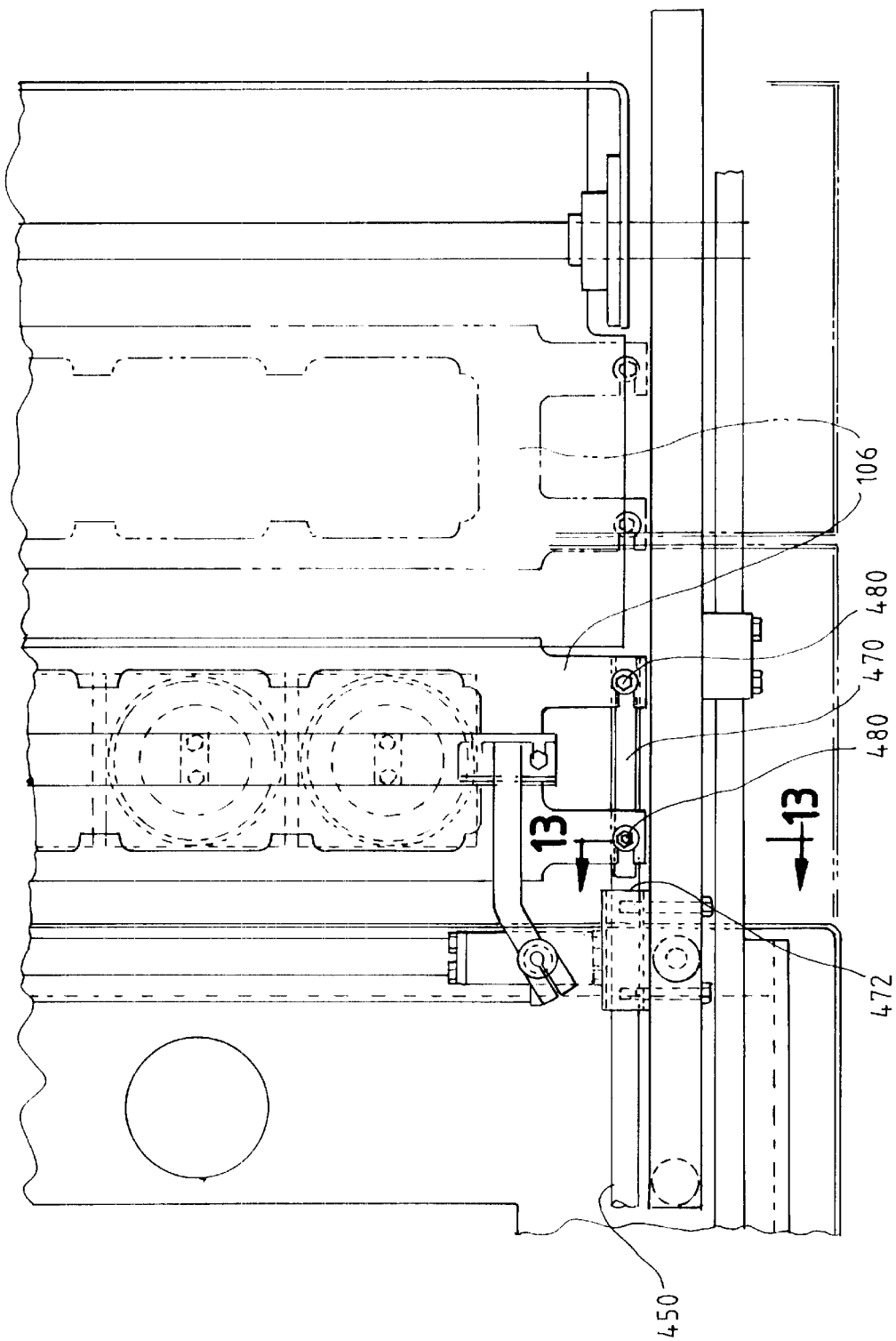
FIG. 12 is a fragmentary enlarged view taken from FIG. 10.

FIGS. 15A and 15B show the rod 450 in isolation including the flat end 456 and keyway 460. FIG. 12 shows the vacuum bar 106 connected to an opposite end of the rod 450, particularly on a top flat surface 470 thereof. The flat surface is also shown in FIGS. 15A and 15B. Two positions of the vacuum bar 106 are shown (one shown solid and one shown in phantom) corresponding to the reciprocation of the rod 450. The rod 450 also passes through a bearing support 472 between the intermediate plate 462 and the vacuum bar 106.

Figure 13:
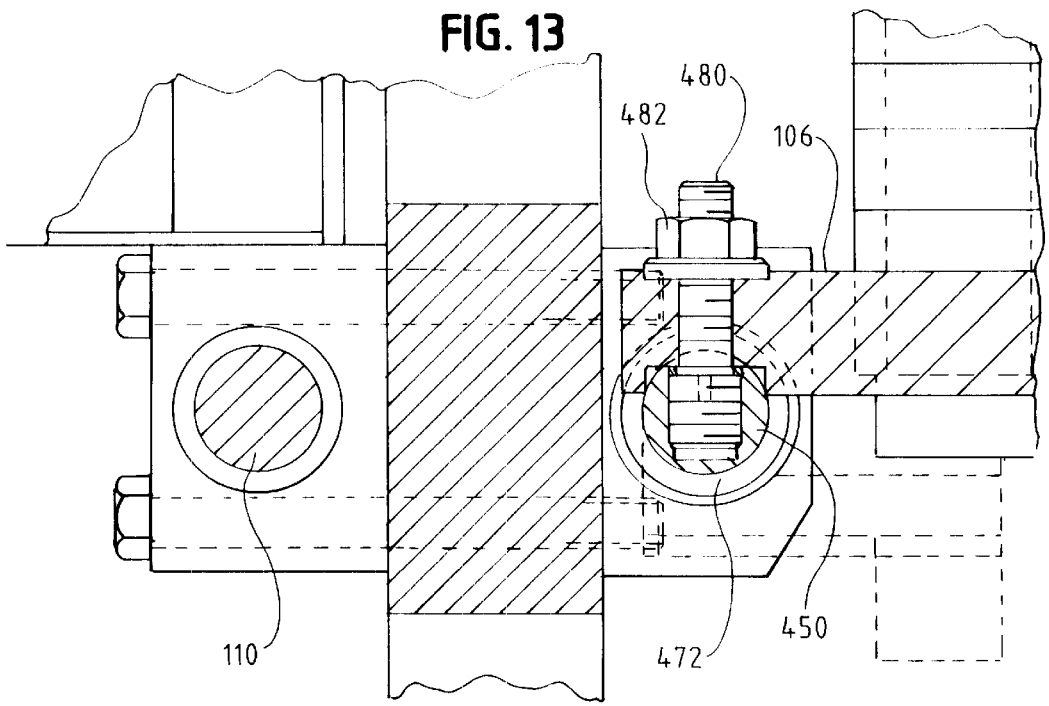
FIG. 13 is a sectional view taken generally along line 13—13 from FIG. 12.

FIG. 13 shows in section the vacuum shuttle bar 450 connected to the vacuum bar 106 using a threaded stud 480 threaded into the rod 450, and having an overlying nut 482 drawn tight on the stud, onto the vacuum bar 106.

From the foregoing, it will be observed that numerous variations and modifications may be effected without departing from the spirit and scope of the invention. It is to be understood that no limitation with respect to the specific apparatus illustrated herein is intended or should be inferred.

What is claimed is:

1. A patty forming machine, comprising:
a reciprocating device including a single pivotal rocker arm having a distal end, and an electric motor operatively connected to oscillate said pivotal rocker arm, said distal end oscillating in a longitudinal plane;
a compartment which encloses said reciprocating device and which has a front wall;
a mold plate arranged to reciprocate outside of said compartment by force from said rocker arm, said mold plate having plural, transversely arranged cavities for receiving food product to form patties;
two seals mounted to said front wall, surrounding two respective openings through said front wall;
two drive rods arranged in parallel and penetrating said two seals, both said drive rods having round cross-sections along lengths thereof which reciprocate through said seals; and
a slide plate means for bridging between said two drive rods, said pivotal rocker arm connected at said distal end thereof to said slide plate means, said slide plate means for distributing reciprocating force to said two drive rods, said slide plate retained within said compartment throughout reciprocating travel of said slide plate, said two drive rods extending longitudinally from said slide plate means at positions on opposite sides of said longitudinal plane.

2. The machine according to claim 1, further comprising:
a further seal mounted to said front wall, surrounding a further opening; and
a vacuum bar assembly having a reciprocating rod and a vacuum bar for interleaving flexible paper sheets with formed patties, said vacuum bar being driven by said reciprocating rod, the reciprocating rod operatively connected to the reciprocating device, and passing through the front wall, said reciprocating rod having a round cross-section along a length thereof which reciprocates through said further seal.

3. The machine according to claim 2, wherein said vacuum bar assembly includes a rack, and an intermediate plate, the reciprocating rod fastened to the intermediate plate, the intermediate plate fastened to the rack, the rack and intermediate plate located within said compartment.

4. The machine according to claim 1, further comprising:
a frame structure which carries said compartment, said frame structure having a bottom horizontal frame;
a bottom skin underlying said frame structure; and
said bottom horizontal frame supporting said reciprocating device, said bottom skin spaced a distance below said bottom horizontal frame to form a vertical gap to allow spray cleaning of a top surface of said bottom skin, said top surface being substantially entirely exposed to spray cleaning.

5. A patty forming machine, comprising:
a compartment which encloses a reciprocating device and which has a front wall;
a mold plate arranged to reciprocate outside of said compartment by force from said reciprocating device, said mold plate having at least one cavity for receiving food product to form a patty;
two seals mounted to said front wall, surrounding two respective openings;
two drive rods arranged in parallel and operatively connecting said reciprocating device to said mold plate, said two drive rods penetrate through said openings in said front wall, said drive rods penetrating said seals mounted to said front wall, each of said drive rods having a round cross-section; and
a slide plate within said compartment connected between said two drive rods and said reciprocating device, said reciprocating device connected to a middle of an end of said slide plate, said slide plate distributing reciprocating force from said reciprocating device to said two drive rods, said slide plate retained within said compartment throughout reciprocating travel of said slide plate, said two drive rods extending longitudinally from said slide plate at laterally spaced-apart positions.

6. A patty forming machine comprising:
a compartment which encloses a reciprocating device and which has a front wall;
a mold plate arranged to reciprocate outside of said compartment by force from said reciprocating device, said mold plate having at least one cavity for receiving food product to form a patty;
a seal carried by said front wall and surrounding an opening; and a vacuum bar assembly having a vacuum bar for interleaving flexible paper sheets with formed patties, said vacuum bar being driven by a reciprocating rod, the reciprocating rod operatively connected to the reciprocating device, and passing through the front wall, the reciprocating rod having a round cross-section along a length thereof which reciprocates through said seal, said reciprocating rod including a flat surface adjacent to said round cross-section adapted for fastening said reciprocating rod to said reciprocating device.

7. The machine according to claim 6, wherein said vacuum bar assembly includes a rack, and an intermediate plate, the reciprocating rod fastened to the intermediate plate, the intermediate plate fastened to the rack, the rack and intermediate plate located within said compartment.

8. A patty forming machine, comprising:

a frame structure which carries a reciprocating device;

a mold plate arranged to reciprocate by a force from said reciprocating device, said mold plate having at least one cavity for receiving food product to form a patty;

wherein said frame structure has a bottom horizontal frame, and including a bottom skin underlying said frame structure, said bottom skin spaced a distance below said bottom horizontal frame to form a vertical gap.

9. The machine according to claim 8, wherein said gap has a height of about 1 inch.

10. A patty forming machine, comprising:

a frame structure;

a compartment carried by said frame structure, said compartment enclosing a reciprocating device and having a front wall;

a mold plate arranged to reciprocate outside of said compartment by force from said reciprocating device, said mold plate having at least one cavity for receiving food product to form a patty;

two annular seals arranged around two openings in said front wall respectively;

two drive rods arranged in parallel, said drive rods connecting said reciprocating device to said mold plate, said drive rods penetrating through said openings in said front wall, said drive rods penetrating said seals, said drive rods having round cross-sections along lengths thereof which reciprocate through said seals;

wherein said reciprocating device comprises a rocker arm and a motor, rotary power from the motor causing pivotal reciprocation of the rocker arm, said rocker arm oscillating in a longitudinal plane;

a slide plate connected between said two drive rods and connected to said rocker arm, said slide plate distributing reciprocating force from said rocker arm to said two drive rods, said slide plate retained within said compartment throughout reciprocating travel of said slide plate, said two drive rods extending longitudinally from said slide plate at positions on opposite sides of said longitudinal plane.

a further pair of annular seals which surround further openings through said front wall;

a vacuum bar assembly having a pair of reciprocating rods and a vacuum bar for interleaving flexible paper sheets with formed patties, said vacuum bar being driven by said reciprocating rods, the reciprocating rods operatively connected to the reciprocating device, and passing through said further openings, the reciprocating rods each having a round cross-section along lengths thereof which reciprocate through said further annular seals respectively;

wherein said vacuum bar assembly includes a pair of racks, and a pair of intermediate plates, each reciprocating rod fastened to one of the intermediate plates, each of the intermediate plates fastened to one of the racks, the racks and intermediate plates located within said compartment;

a bottom skin underlying said frame structure; and said frame structure has a bottom horizontal frame, said bottom horizontal frame supporting said reciprocating device, said bottom skin spaced a distance below said bottom horizontal frame to form a vertical gap to allow spray cleaning of a top surface of said bottom skin, said top surface being substantially exposed to spray cleaning.

* * * * *

UNITED STATES PATENT AND TRADEMARK OFFICE
CERTIFICATE OF CORRECTION

PATENT NO.   : 6,428,303 B2
DATED        : August 6, 2002
INVENTOR(S)  : Lindee et al.

It is certified that error appears in the above-identified patent and that said Letters Patent is hereby corrected as shown below:

<u>Column 8,</u>
Line 2, add -- means -- after "said slide plate".
Line 4, add -- means -- after "plate".
Line 32, delete the word "entirely".

Signed and Sealed this

Fifteenth Day of July, 2003

JAMES E. ROGAN
*Director of the United States Patent and Trademark Office*